(12) United States Patent
Ma

(10) Patent No.: US 12,111,741 B2
(45) Date of Patent: Oct. 8, 2024

(54) AUTOMATIC TEST METHOD AND APPARATUS, ELECTRONIC DEVICE, AND STORAGE MEDIUM

(71) Applicant: Beijing Baidu Netcom Science and Technology Co., Ltd., Beijing (CN)

(72) Inventor: Chen Ma, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/754,561

(22) PCT Filed: Jul. 6, 2021

(86) PCT No.: PCT/CN2021/104781
§ 371 (c)(1),
(2) Date: Apr. 6, 2022

(87) PCT Pub. No.: WO2022/179034
PCT Pub. Date: Sep. 1, 2022

(65) Prior Publication Data
US 2024/0061759 A1    Feb. 22, 2024

(30) Foreign Application Priority Data
Feb. 26, 2021    (CN) .......................... 202110216597.3

(51) Int. Cl.
G06F 11/28    (2006.01)
(52) U.S. Cl.
CPC .................................. G06F 11/28 (2013.01)
(58) Field of Classification Search
CPC ........................................................ G06F 11/28

USPC ............................................................ 714/46
See application file for complete search history.

(56) References Cited

U.S. PATENT DOCUMENTS

| | | | | |
|---|---|---|---|---|
| 8,578,337 | B2 * | 11/2013 | Van Riel | G06F 11/3495 |
| | | | | 717/124 |
| 2003/0098879 | A1 * | 5/2003 | Mathews | G06F 11/3688 |
| | | | | 714/E11.208 |
| 2009/0282136 | A1 | 11/2009 | Subramanian | |
| 2015/0106791 | A1 | 4/2015 | Karuppiah et al. | |
| 2015/0178184 | A1 | 6/2015 | Hishioka et al. | |
| 2019/0213104 | A1 | 7/2019 | Qadri et al. | |

(Continued)

FOREIGN PATENT DOCUMENTS

| | | |
|---|---|---|
| CN | 104572444 A | 4/2015 |
| CN | 104834595 A | 8/2015 |
| CN | 106484622 A | 3/2017 |

(Continued)

OTHER PUBLICATIONS

Chinese Official Action dated May 29, 2023, issued in corresponding Chinese Application.

*Primary Examiner* — Yair Leibovich
(74) *Attorney, Agent, or Firm* — Husch Blackwell LLP

(57) ABSTRACT

An automatic test method and apparatus, an electronic device, and a storage medium are provided, which relate to the fields of the automatic test, the voice testing, the voice effect acceptance check, etc. The method includes: receiving a test task initiated by a visualization front-end; issuing the test task to a plurality of clients deployed; and scheduling execution of the test task for the plurality of clients, and feeding back obtained task execution results to the visualization front-end.

16 Claims, 10 Drawing Sheets

(56) References Cited

U.S. PATENT DOCUMENTS

2019/0361801 A1  11/2019  Roth

FOREIGN PATENT DOCUMENTS

| CN | 106598836 A | 4/2017 |
| CN | 107577598 A | 1/2018 |
| CN | 109213682 A | 1/2019 |
| CN | 109902006 A | 6/2019 |
| CN | 110083544 A | 8/2019 |
| CN | 110675857 A | 1/2020 |
| CN | 110749814 A | 2/2020 |
| CN | 110874319 A | 3/2020 |
| CN | 112882939 A | 6/2021 |

* cited by examiner

AUTOMATIC TEST METHOD AND APPARATUS, ELECTRONIC DEVICE, AND STORAGE MEDIUM

CROSS-REFERENCE TO RELATED APPLICATION

The present disclosure is a National Stage application of PCT international application PCT/CN2021/104781, filed on Jul. 6, 2021, which claims priority to a Chinese Patent Application No. 202110216597.3, filed with the China National Intellectual Property Administration on Feb. 26, 2021 and entitled "AUTOMATIC TEST METHOD AND APPARATUS, ELECTRONIC DEVICE, AND STORAGE MEDIUM", both of which are incorporated herein by reference in their entireties.

TECHNICAL FIELD

The present disclosure relates to the field of computer technology processing. The disclosure particularly relates to the fields of the automatic test, the voice testing, the voice effect acceptance check, etc.

BACKGROUND

For a test task, taking a voice test as an example, the layout of the test scenario or other operations can be carried out artificially to simulate the use scenario of real users. There are also some automated test schemes, but the test schemes are all partially automated, and the auxiliary processing of the test schemes still needs to be carried out artificially. For example, the cooperative operation of sound sources, the collection of test data, etc., need to be completed manually.

SUMMARY

The disclosure provides an automatic test method and apparatus, an electronic device, and a storage medium.

According to an aspect of the present disclosure, there is provided an automatic test method including:
  receiving a test task initiated by a visualization front-end;
  issuing the test task to a plurality of clients deployed; and
  scheduling execution of the test task for the plurality of clients, and feeding back obtained task execution results to the visualization front-end.

According to another aspect of the present disclosure, there is provided an automatic test method including:
  receiving a test task issued by a central control system, wherein the test task is initiated by a visualization front-end;
  accepting scheduling of the central control system and executing the test task, to obtain a task execution result; and
  reporting the task execution result to the central control system, such that the central control system forwards the task execution result to the visualization front-end.

According to another aspect of the present disclosure, there is provided an automatic test method including:
  a visualization front-end initiating a test task;
  a central control system receiving the test task and issuing the test task to a plurality of clients deployed;
  the plurality of clients respectively accepting scheduling of the central control system, executing the test task, and reporting obtained task execution results to the central control system; and
  the central control system feeding back the task execution results to the visualization front-end.

According to another aspect of the present disclosure, there is provided an automatic test apparatus, including a visualization front-end, a central control system, and a plurality of clients, wherein
  the visualization front-end initiates a test task;
  the central control system receives the test task and issues the test task to a plurality of clients deployed;
  the plurality of clients respectively accepts scheduling of the central control system, performs the test task, and reports obtained task execution results to the central control system; and
  the central control system feeds back the task execution results to the visualization front-end.

According to another aspect of the present disclosure, there is provided an electronic device including:
  at least one processor; and
  a memory connected communicatively to the at least one processor, wherein
  the memory stores instructions executable by the at least one processor, and the instructions, when executed by the at least one processor, enable the at least one processor to perform the method provided by any one embodiment of the present disclosure.

According to another aspect of the present disclosure, there is provided a non-transitory computer readable storage medium storing computer instructions, wherein the computer instructions, when executed by a computer, cause the computer to perform the method provided by any one embodiment of the present disclosure.

It should be understood that the contents described in this section are not intended to identify key or important features of embodiments of the present disclosure, nor are they intended to limit the scope of the present disclosure. Other features of the present disclosure will become easily understood from the following description.

BRIEF DESCRIPTION OF THE DRAWINGS

The drawings are used to better understand the solution and do not constitute a limitation to the present disclosure. In the drawings.

DETAILED DESCRIPTION

The exemplary embodiments of the disclosure will be described below in combination with drawings, including various details of the embodiments of the disclosure to facilitate understanding, which should be considered as exemplary only. Therefore, those of ordinary skill in the art should realize that various changes and modifications can be made to the embodiments described herein without departing from the scope and spirit of the present disclosure. Likewise, descriptions of well-known functions and structures are omitted in the following description for clarity and conciseness.

The term "and/or" herein is only an association relationship describing associated objects, which means that there can be three kinds of relationships. For example, A and/or B can mean the following three situations: there is A alone, there are A and B at the same time, and there is B alone. The term "at least one" herein means any one of the plurality or any combination of at least two of the plurality, for example, including at least one of A, B, and C, and may mean including any one or more elements selected from a set composed of A, B, and C. The terms "first" and "second" herein refer to multiple similar technical terms and distinguish them. They do not limit the order or do not limit only two. For example, the first feature and the second feature refer to two types of features or two features. There can be one or more first features, and there can also be one or more second features.

In addition, in order to better explain the present disclosure, numerous specific details are given in the following specific implementations. Those skilled in the art should understand that the present disclosure can also be implemented without some specific details. In some examples, the methods, means, elements, and circuits well known to those skilled in the art are not described in detail in order to highlight the subject matter of the present disclosure.

Figure 1:
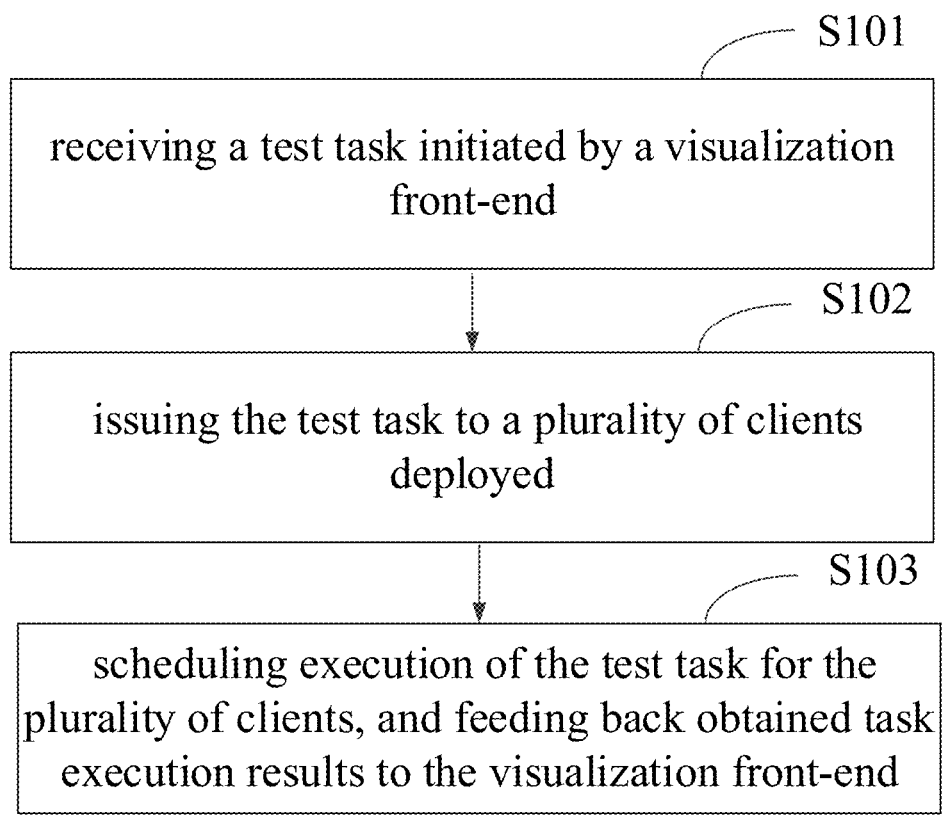
FIG. 1 is a schematic flow diagram of an automatic test method according to an embodiment of the present disclosure.

According to an embodiment of the present disclosure, an automatic test method is provided. FIG. 1 is a schematic flow diagram of an automatic test method according to an embodiment of the present disclosure. The method can be applied to an automatic test device. For example, in a case where the device can be deployed in a terminal or a server or another processing device, the test task issuing, the test task scheduling, etc., can be performed. The terminal can be a user equipment (UE), a mobile device, a cellular phone, a cordless phone, a personal digital assistant (PDA), a handheld device, a computing device, a vehicle-mounted device, a wearable device, etc. In some possible implementations, the method can also be implemented by a processor calling computer-readable instructions stored in a memory. As shown in FIG. 1, the method, when running in a central control system, includes:

S101, receiving a test task initiated by a visualization front-end;

S102, issuing the test task to a plurality of clients deployed; and

S103, scheduling execution of the test task for the plurality of clients, and feeding back obtained task execution results to the visualization front-end.

In an example based on S101-S103, the central control system can receive the test task initiated by the visualization front-end (web front-end) through a hyper text transfer protocol (HTTP). The test task includes: a test parameter and data to be tested, wherein the test parameter includes: at least one test parameter of a test product type, a test version, a test scenario, or a test device state. After the central control system issues the test task to the a plurality of clients deployed, the central control system acquires operation state information of devices to be tested, connected to the plurality of clients respectively (for example, whether a test condition is met, that is, whether a corresponding device to be tested, connected to each client, is an idle device to be tested, and if the device to be tested is idle, it is indicated that the device to be tested is currently in an available state), and the central control system schedules the test task for the plurality of clients according to the operation state information of the devices to be tested. After the plurality of clients perform the test task, the plurality of clients feed back the task execution results to the central control system, and then the central control system forward the task execution results to the visualization front-end.

With the present disclosure, the test task initiated by the visualization front-end can be received and issued to a plurality of clients deployed. The execution of the test task can be scheduled for the plurality of clients, and the obtained task execution results can be fed back to the visualization front-end. Therefore, based on an easy-to-operate interface of the visualization front-end, the task scheduling and issuing of the central control system, and execution of the test task by the clients deployed, a complete set of automatic test process is realized.

In an implementation, the visualization front-end initiating the test task through the HTTP can include: the visualization front-end communicating with the central control system through an HTTP POST request method, and notifying the central control system of triggering/stopping of the test task, issuing of a test parameter, upload of version data to be tested, and download of test data, and so on. The HTTP request method includes GET (such as requesting data from a specified resource) and POST (submitting data to be processed to a specified resource). By adopting this implementation, through the easy-to-operate visualization interface of the visualization front-end, the automatic test task deployment can be realized for the test personnel, the operation complexity of the test personnel can be simplified, and the operation efficiency can be improved.

In an implementation, the method further includes: receiving registration requests initiated by the plurality of clients respectively; in response to the registration requests, issuing a state query instruction to the plurality of clients respectively; and deploying the plurality of clients according to test task states reported by the plurality of clients respectively, wherein the test task states include: test task states of devices to be tested, connected to the plurality of clients respectively. With this implementation, the central control system can issue a state query instruction to the plurality of clients after receiving the registration requests, to deploy the plurality of clients according to the test task states of the devices to be tested (for example, whether a test condition is met, that is, whether a corresponding device to be tested, connected to each client, is an idle device to be tested, and if the device to be tested is idle, it is indicated that the device to be tested is currently in an available state), realizing the automatic client deployment operation and improving the processing efficiency.

In an implementation, the scheduling the execution of the test task for the plurality of clients, and feeding back the obtained task execution results to the visualization front-end, includes: acquiring operation state information of devices to be tested, connected to the plurality of clients respectively, and performing the scheduling according to the operation state information of the devices to be tested, for example, in a case where the test task states of the devices to be tested are available, the test task is scheduled to a client, connected to a corresponding device to be tested that is idle, for execution; and receiving the task execution results reported respectively by the plurality of clients through a transmission control protocol (TCP), and feeding back the task execution results to the visualization front-end. With this implementation, the test task can be reasonably scheduled according to the operation state information, such that the automatic task scheduling operation is realized, the processing efficiency is improved, and the central control system can directly feed back the task execution results to the visualization front-end.

In an implementation, the task execution results are stored locally or provided to a cloud; a local storage address or a storage address in the cloud is written into a database to be provided to the visualization front-end, such that the visualization front-end downloads the task execution results based on the storage address. With this implementation, the method of writing the "storage address" into the database can be adopted between the central control system and the visualization front-end, such that the test personnel using the visualization front-end can regularly download the task execution results according to the test requirement.

Figure 2:
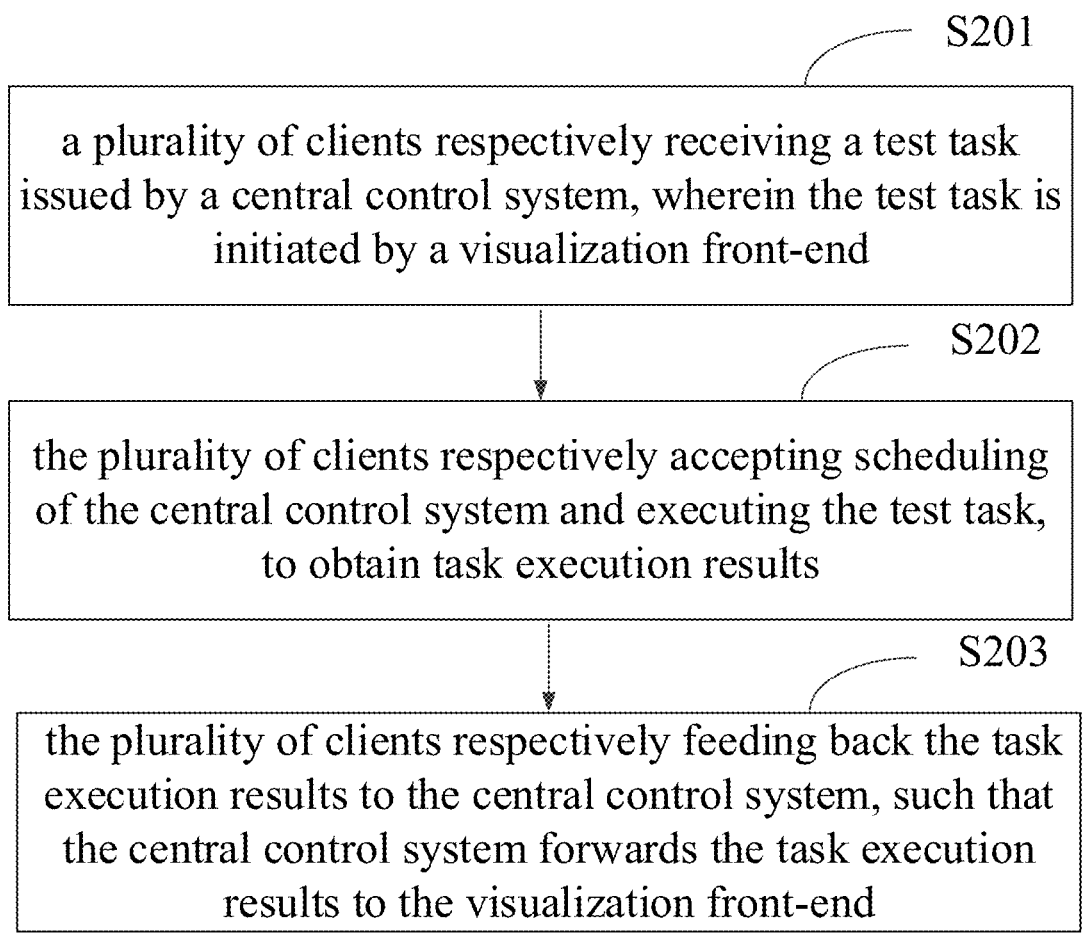
FIG. 2 is a schematic flow diagram of an automatic test method according to an embodiment of the present disclosure.

According to an embodiment of the present disclosure, an automatic test method is provided. FIG. 2 is a schematic flow diagram of an automatic test method according to an embodiment of the present disclosure. The method can be applied to an automatic test device. As shown in FIG. 2, the method, when running in any client, includes:

S201, a plurality of clients respectively receiving a test task issued by a central control system, wherein the test task is initiated by a visualization front-end;

S202, the plurality of clients respectively accepting scheduling of the central control system and executing the test task, to obtain task execution results; and S203, the plurality of clients respectively feeding back the task execution results to the central control system, such that the central control system forwards the task execution results to the visualization front-end.

In an example of S201-S203, the plurality of clients can be deployed first; by taking any client as an example, the client can initiate a registration request to the central control system, the client receives a state query instruction issued by the central control system, and the client reports a test task state of a device to be tested, locally connected to the client, to the central control system, such that the deployment is completed; then, a test process can be performed by the client, for example, after the test task is triggered by the visualization front-end, the test task is sent to the central control system, the client can receive the test task through scheduling of the central control system, the client detects whether the device to be tested, locally connected to the client, is in an available state, in a case where the device to be tested is in the available state, the client invokes an execution script, and the execution script executes the test task and outputs a task execution result according to a preset format (such as a format required by the client); finally, the client sends the task execution result to the visualization front-end through the central control system for display.

By adopting the present disclosure, the plurality of clients deployed can respectively receive the test task initiated by the visualization front-end, the plurality of clients respectively execute the test task under the scheduling of the central control system and report the obtained task execution results to the central control system, and then the central control system feeds back the task execution results to the visualization front-end, such that based on an easy-to-operate interface of the visualization front-end, the task scheduling and issuing of the central control system, and execution of the test task by the clients deployed, a complete set of automatic test process is realized.

In an implementation, the method further includes: the plurality of clients respectively initiating registration requests to the central control system; the plurality of clients respectively receiving a state query instruction issued by the central control system; and in response to the state query instruction, the plurality of clients respectively reporting test task states to the central control system, wherein the test task states include test task states of devices to be tested, connected to the plurality of clients respectively, such that the plurality of clients are deployed based on the test task states. With this implementation, the central control system can issue the state query instruction to the plurality of clients after receiving the registration requests, to deploy the plurality of clients according to the test task states of the devices to be tested (for example, whether a test condition is met, that is, whether a corresponding device to be tested, connected to each client, is an idle device to be tested, and if the device to be tested is idle, it is indicated that the device to be tested is currently in an available state), realizing the automatic client deployment operation and improving the processing efficiency.

In an implementation, the accepting the scheduling of the central control system and executing the test task, to obtain the task execution results, includes: reporting operation state information of the devices to be tested, connected to the plurality of clients respectively, to the central control system to accept the scheduling according to the operation state information of the devices to be tested; the plurality of clients respectively detecting whether the operation state information of the devices to be tested, connected to the plurality of clients respectively, is an available state; in a case where the devices to be tested are in the available state, the plurality of clients respectively calling their respective execution scripts; running the execution scripts, and executing the test task according to respective preset formats required by the plurality of clients (such as formats required by the clients) to obtain the task execution results. In this embodiment, a client receives an instruction issued by the central control system (execution of a specific instruction can be realized by an execution script). In the process of executing a task, the execution script executes the task according to a format required by the client and outputs a task execution result, so as to realize an automatic test. As long as the execution script is developed according to a system data interaction protocol, a new device to be tested or a new test capability can seamlessly access the system.

In an implementation, the feeding back the task execution results to the central control system, such that the central control system forwards the task execution results to the visualization front-end, includes: the plurality of clients respectively reporting the task execution results to the central control system through the TCP, to feed back the task execution results to the visualization front-end through the central control system. In this implementation, the clients communicate the task execution results to the central control system through the TCP, and then the central control system can forward the task execution results to the visualization front-end for display, such that the whole test process realizes automatic processing.

Figure 3:
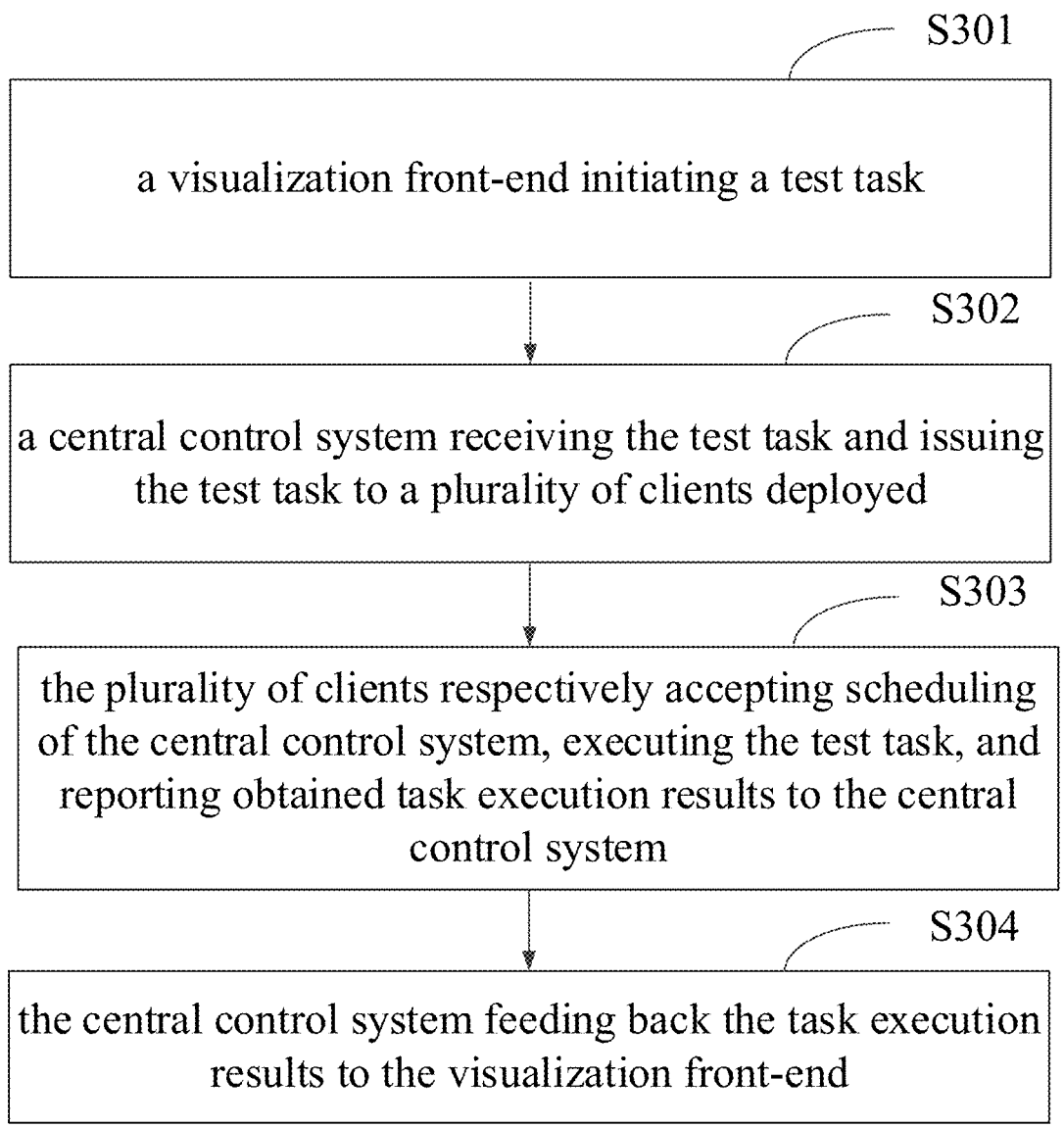
FIG. 3 is a schematic flow diagram of an automatic test method according to an embodiment of the present disclosure.

According to an embodiment of the present disclosure, an automatic test method is provided. FIG. 3 is a schematic flow diagram of an automatic test method according to an embodiment of the present disclosure. The method can be applied to an automatic test apparatus. As shown in FIG. 3, the method, when running in an automatic test apparatus including a visualization front-end, a central control system, and a plurality of clients, includes:

S301, the visualization front-end initiating a test task;

S302, the central control system receiving the test task and issuing the test task to the plurality of clients deployed;

S303, the plurality of clients respectively accepting scheduling of the central control system, executing the test task, and reporting obtained task execution results to the central control system; and S304, the central control system feeding back the task execution results to the visualization front-end.

By adopting the present disclosure, after the visualization front-end initiates the test task, the central control system can issue the test task and perform task scheduling among the plurality of clients deployed, the plurality of clients deployed can respectively receive the test task initiated by the visualization front-end, the plurality of clients respectively execute the test task under the scheduling of the central control system and report the obtained task execution results to the central control system, and then the central control system feeds back the task execution results to the visualization front-end, such that based on an easy-to-operate interface of the visualization front-end, the task scheduling and issuing of the central control system, and execution of the test task by the clients deployed, a complete set of automatic test process is realized.

In an implementation, the visualization front-end initiating the test task, includes: the visualization front-end initiating the test task through the HTTP. Specifically, the visualization front-end can communicate with the central control system through an HTTP POST request method, and notify the central control system of triggering/stopping of the test task, issuing of a test parameter, upload of version data to be tested, and download of test data. The HTTP request method includes GET (such as requesting data from a specified resource) and POST (submitting data to be processed to a specified resource). By adopting this implementation, through the easy-to-operate visualization interface of the visualization front-end, the automatic test task deployment can be realized for the test personnel, the operation complexity of the test personnel can be simplified, and the operation efficiency can be improved.

In an implementation, the method further includes: the central control system receiving registration requests initiated by the plurality of clients respectively; in response to the registration requests, issuing a state query instruction to the plurality of clients respectively; deploying the plurality of clients according to test task states reported by the plurality of clients respectively, wherein, the test task states include: test task states of devices to be tested, connected to the plurality of clients respectively. With this implementation, the central control system can issue the state query instruction to the plurality of clients after receiving the registration requests, to deploy the plurality of clients according to the test task states of the devices to be tested (for example, whether a test condition is met, that is, whether a corresponding device to be tested, connected to each client, is an idle device to be tested, and if the device to be tested is idle, it is indicated that the device to be tested is currently in an available state), realizing the automatic client deployment operation and improving the processing efficiency.

In an implementation, the plurality of clients respectively accepting the scheduling of the central control system, executing the test task, and reporting obtained task execution results to the central control system, includes: the plurality of clients respectively reporting operation state information of the devices to be tested, connected to the plurality of clients respectively, to the central control system, to accept the scheduling according to the operation state information of the devices to be tested; the plurality of clients respectively detecting whether the operation state information of the devices to be tested, connected to the plurality of clients respectively, is an available state; in a case where the devices to be tested are in the available state, the plurality of clients calling their respective execution scripts respectively; running the execution scripts, executing the test task according to respective preset formats required by the plurality of clients (such as formats required by the clients) to obtain task execution results, and reporting the obtained task execution results to the central control system. In this embodiment, a client receives an instruction issued by the central control system (execution of a specific instruction can be realized by an execution script). In the process of executing a task, the execution script executes the task according to a format required by the client and outputs a task execution result, so as to realize an automatic test. As long as the execution script is developed according to a system data interaction protocol, a new device to be tested or a new test capability can seamlessly access the system.

In an implementation, the method further includes: storing the task execution results locally or providing the task execution results to a cloud; writing a local storage address or a storage address in the cloud into a database, to provide the storage address to the visualization front-end, such that the visualization front-end downloads the task execution results based on the storage address. With this implementation, the method of writing the "storage address" into the database can be adopted between the central control system and the visualization front-end, such that the test personnel using the visualization front-end can regularly download the task execution results according to the test requirement.

APPLICATION EXAMPLE

The test task takes the voice as an example. In the voice effect acceptance check of the voice system, the test is often executed end-to-end. Numerous modules will be involved in the end-to-end overall link, and up to 40 typical test scenarios can be derived based on different hardware voice pickup schemes, product functions, and user usage scenarios. In a full-scale test, the traditional artificial test with 10 key test items can be included, and the typical manpower is 4*28 persons/day. The key consumed time is distributed in the field control, the Query reading, and the data statistical analysis. With the rapid expansion of voice business and the explosive growth of product types, problems of low efficiency, long test and training cycle, and high cost of the traditional artificial test have become increasingly prominent, and have become the bottleneck of project throughput such as delivery.

Using the traditional artificial acoustic method for the test includes: 1) the layout of the test scene is carried out artificially to simulate the real user's use scene, including the environmental layout, the sound source, the location and placing of the device to be tested, etc.; and 2) the reading of the test text needs to coordinate the artificial voice of men and women personnel with different gender ratios; and 3) the relevant control of the test process, including the devices to be tested, the sound source cooperative operation, collection and statistical analysis of the test data, can only be partially automated, but still need to be completed manually, and finally the test report is output.

Although the above scheme can save a part of artificial time by solving the reading of artificial test text, the scene layout, and the data acquisition and analysis, to save the test cycle, this is only a partially automatic test. There is a need for a complete set of automatic test process, with the low threshold and higher ease of use.

The disclosure constructs a complete set of automatic acoustic effect test solutions, provides the management of test tasks and the scheduling of test devices, and gives a high efficient solution in the parallel test of multiple types of devices, and also includes the persistence storage function of test information and test data.

The processing flow of applying an embodiment of the present disclosure includes the following contents.

Figure 4:
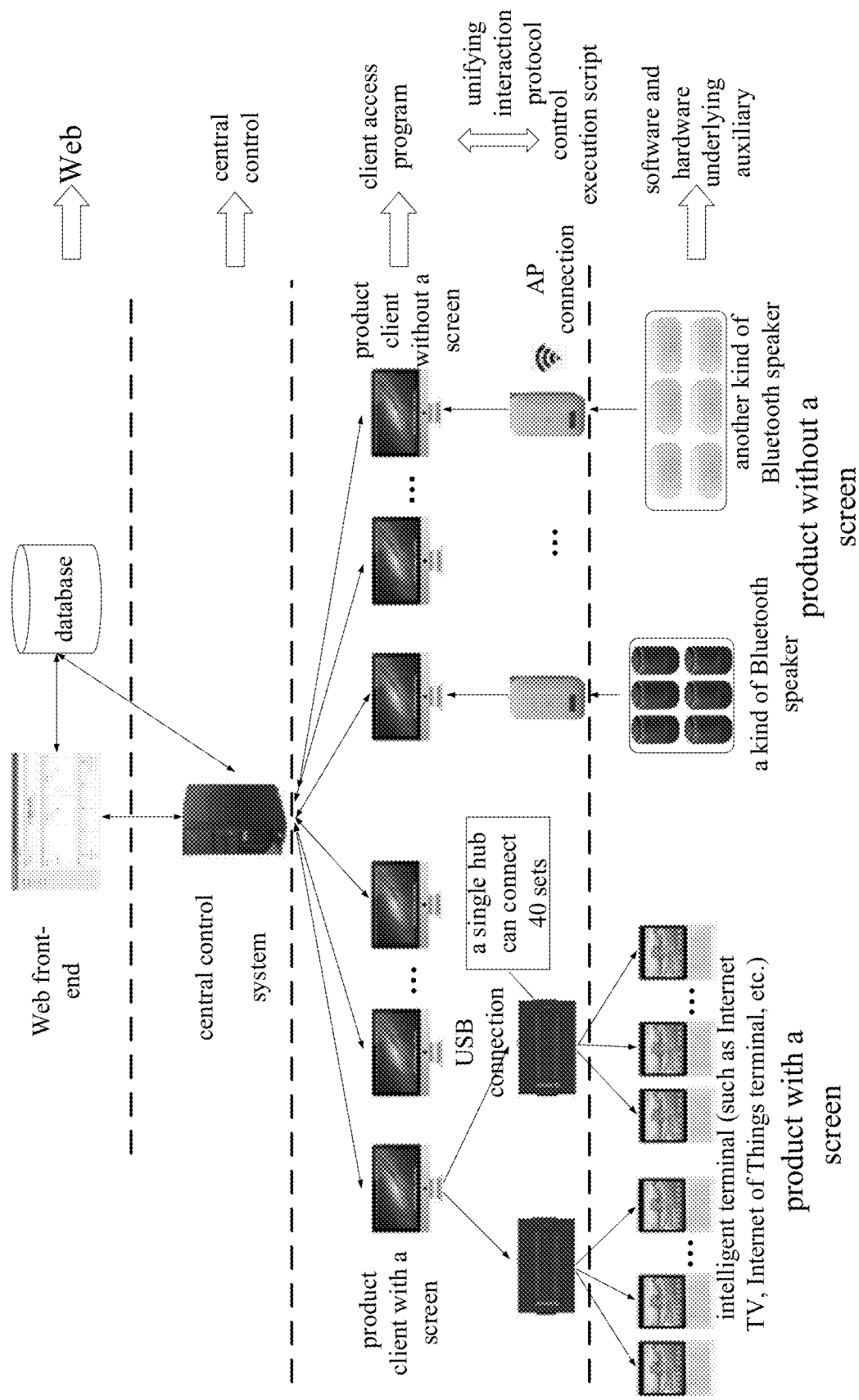
FIG. 4 is a schematic diagram of a test architecture applied to an application example of an embodiment of the present disclosure.

FIG. 4 is a schematic diagram of a test architecture applied to an application example of an embodiment of the present disclosure. A complete set of automatic test process can be realized. For the voice test, various kinds of intelligent terminals or intelligent projects that support voice input and voice interaction can be applied. For example, the test architecture can be used to test the acoustic effect of various intelligent devices, such as Bluetooth speakers, vehicle network products, input methods supporting voice input or various acoustic effect tests. FIG. 4 shows the connection manners between the devices to be tested. The intelligent terminal series in the products with screens can be connected by USB hub, and can query states of the devices to be tested by an adb command; and the Bluetooth speaker series in products with no screen can be connected by WiFi.

As shown in FIG. 4, the test architecture is composed of four portions, including a visualization front-end (such as a Web front-end), a central control system (abbreviated as the central control system), clients (the number of clients is not limited and can be at least two), and underlying auxiliary modules of the devices. The main function of each of the portions is introduced below respectively:

First, the Web Front-End

Figure 5:
FIG. 5 is a task start page applied to an application example of an embodiment of the present disclosure.
Figure 6:
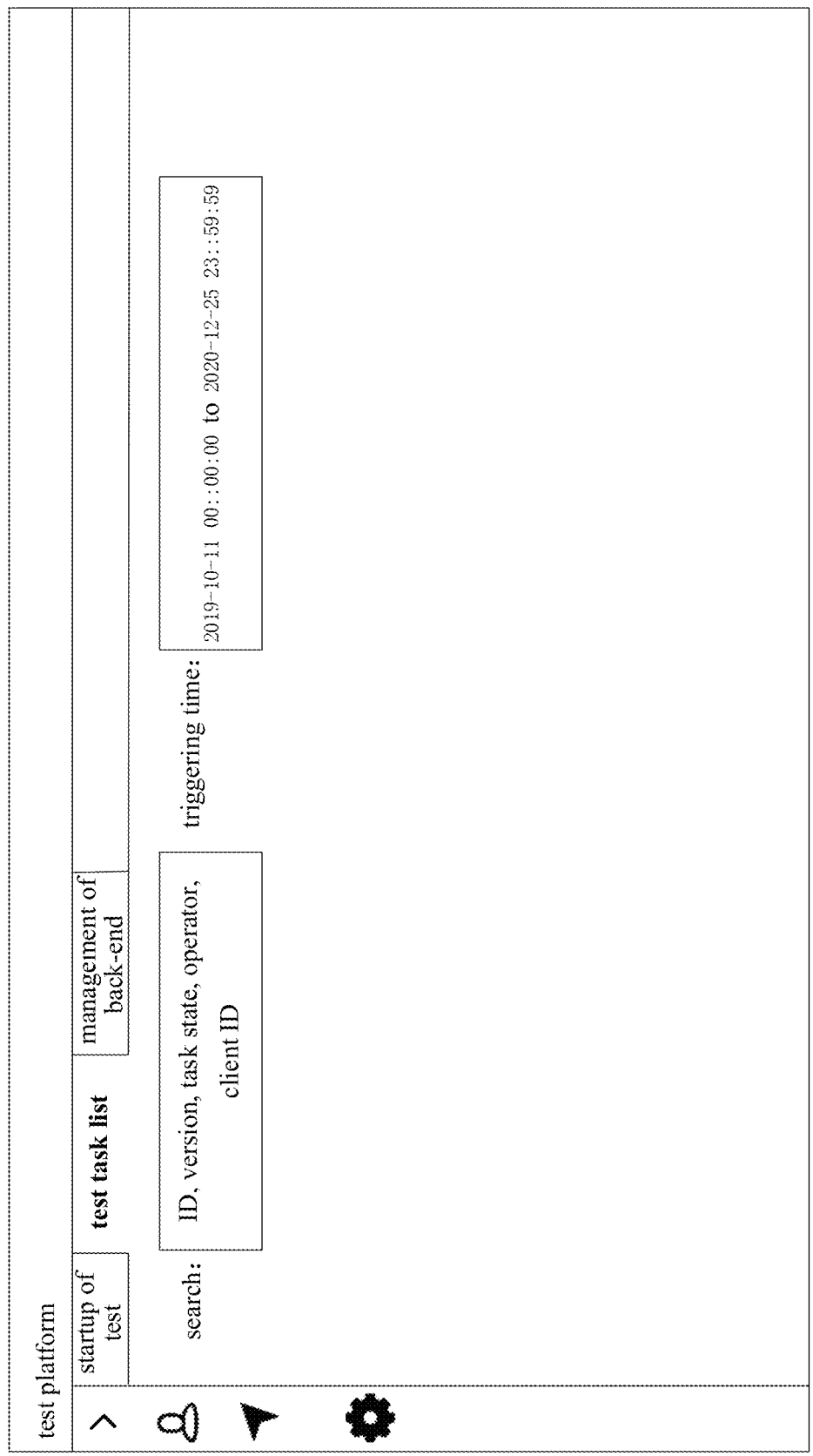
FIG. 6 is a task management page applied to an application example of an embodiment of the present disclosure.

The Web front-end includes two pages: a task start page and a task management page. The Web front-end can be deployed on a Linux server. FIG. 5 is a task start page applied to an application example of an embodiment of the present disclosure. As shown in FIG. 5, the task page is started, which can provide the test personnel with the display functions of the test task parameter configuration, upload of the product to be tested, the task triggering and the currently available test device information. FIG. 6 is a task management page applied to an application example of an embodiment of the present disclosure. As shown in FIG. 6, the task management page provides the test personnel with the function of the task state query, including functions of the task parameter, the task execution state, the task result acquisition, the triggering end time, the personnel to whom the task belongs, and the like.

The Web front-end exchanges data with the central control system through a database to complete acquisition of the system state, including the available test product types, test versions, test scenarios, and test device states. The central control system is informed of the triggering/stop of the task, the issuing of the test parameter, the upload of the version data to be tested, and the download of the test data through the HTTP POST request method.

Second, the Central Control System a) The central control system is responsible for the management of a test task and the scheduling of accessing clients, sends a specific test task to clients meeting a test condition (i.e., connected to the corresponding products to be tested and that there are idle devices to be tested) for execution, and manages the state of each of the clients. The central control system regularly acquire information of a product to be tested, a test scenario, and a task execution state of each of the clients, processes and summarizes the information, and then stores it in the database for display of the web front-end. For the completed task, a test result is sent to the corresponding test personnel in the form of a email.

b) Data persistence storage: the central control system saves the test data of the completed task, which can be saved locally or in a cloud, and stores the extraction address in the database for the test personnel to download from the front-end.

c) Permission control: the central control system manages permissions of different types of platform use personnel, and distinguishes available devices, available test sets, test scenarios, test data download permissions, etc., of different users.

d) Monitoring alarm: the central control system has detection and alarm functions for the abnormal states of the clients.

The central control system is deployed on the Linux server. The central control system interacts with the clients through the TCP, detects the viability of the clients by the heartbeat mechanism, and can access the clients and make the clients offline in real time.

Third, a Client System Composed of a Plurality of Clients

The client system is deployed on a specific PC connected to several devices to be tested. The connection manner can be wired or wireless. The operating system (OS) can support a plurality of system versions, such as Mac, Ubuntu, Windows, etc.

The client system includes two portions: a client program and an execution script. An instruction issued by the central control system is received and performed by the client program, and includes functions of triggering/stop of an available test task, query of a test scenario, query of states of connected devices to be tested, feedback of a task execution state, deployment of a test version, and compression and upload of test data. When the task is triggered, a task parameter received from the central control system is converted into an input data format specified in the execution script and is transferred to the execution script, and the execution script is called to complete the specific execution of the test process. The execution process is mainly divided into stages of pushing of the version to be tested, pushing of the test scene corpus, startup of the test function (such as wake-up and recognition), and acquisition of test data. The task execution state is output by the execution script in a format required by the client program. The control differences and test process differences of different types of devices to be tested can be shielded in the execution script, that is, they are not visible to the client program. Therefore, as long as the execution script is developed according to the system data interaction protocol, a new device to be tested or a new test capability can seamlessly access the system. In addition, a device to be tested, connected to a client, can also be detected, scheduled, and managed by the execution script. The client program can adopt the distributed deployment of a plurality of PCs. The client program notifies access of a new client by sending a registration request to the central control system. This method can greatly alleviate the load of the area coverage router for a device to be tested, connected by WiFi, to reduce the problem of the imprecise effect test caused by the unstable network connection of the device to be tested.

Figure 7:
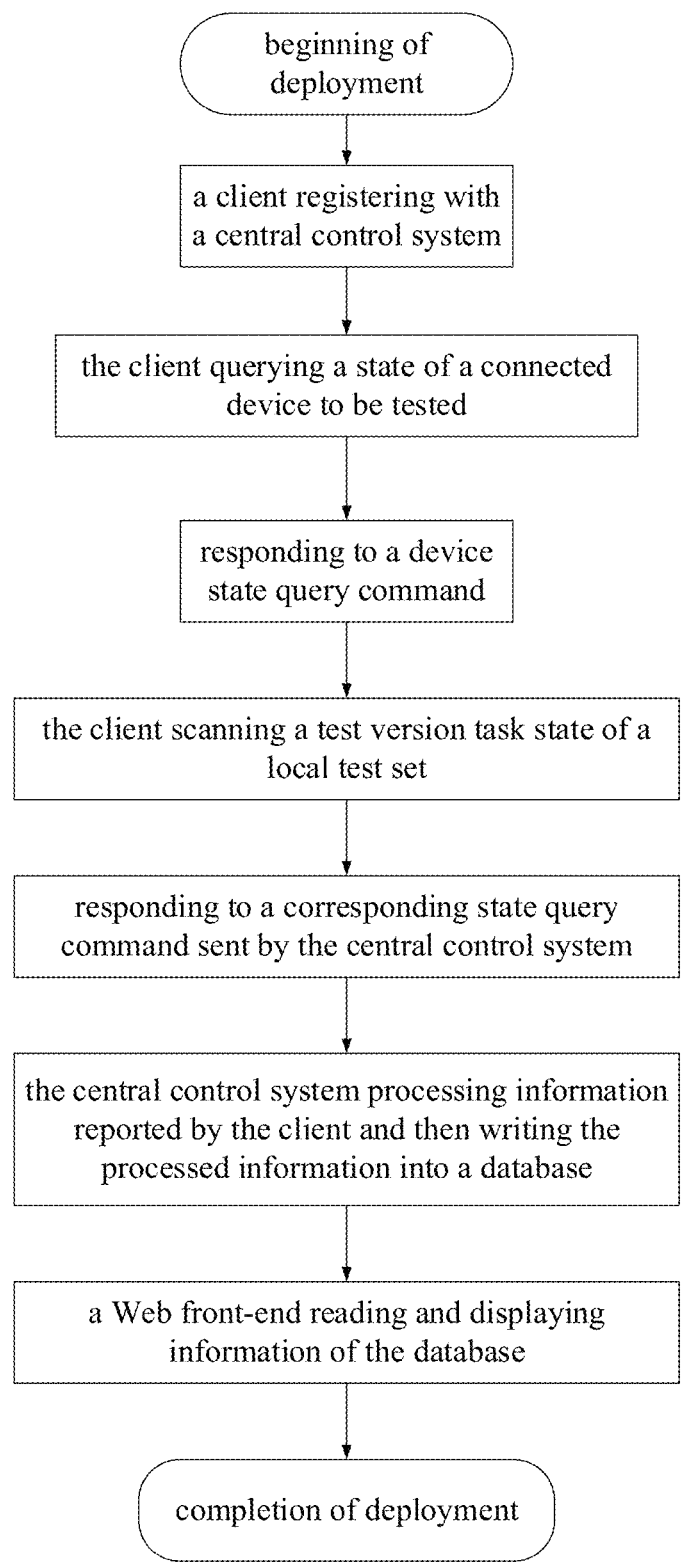
FIG. 7 is a client system deployment flowchart applied to an application example of an embodiment of the present disclosure.

FIG. 7 is a client system deployment flowchart applied to an application example of an embodiment of the present disclosure. As shown in FIG. 7, the flowchart includes: a client registering with a central control system; the client querying a state of a connected device to be tested; responding to a device state query command; the client scanning a test version task state of a local test set; responding to a corresponding state query command sent by the central control system; the central control system processing information reported by the client and then writing the processed information into a database; and a Web front-end reading and displaying information of the database, to complete the deployment of the client.

Figure 8:
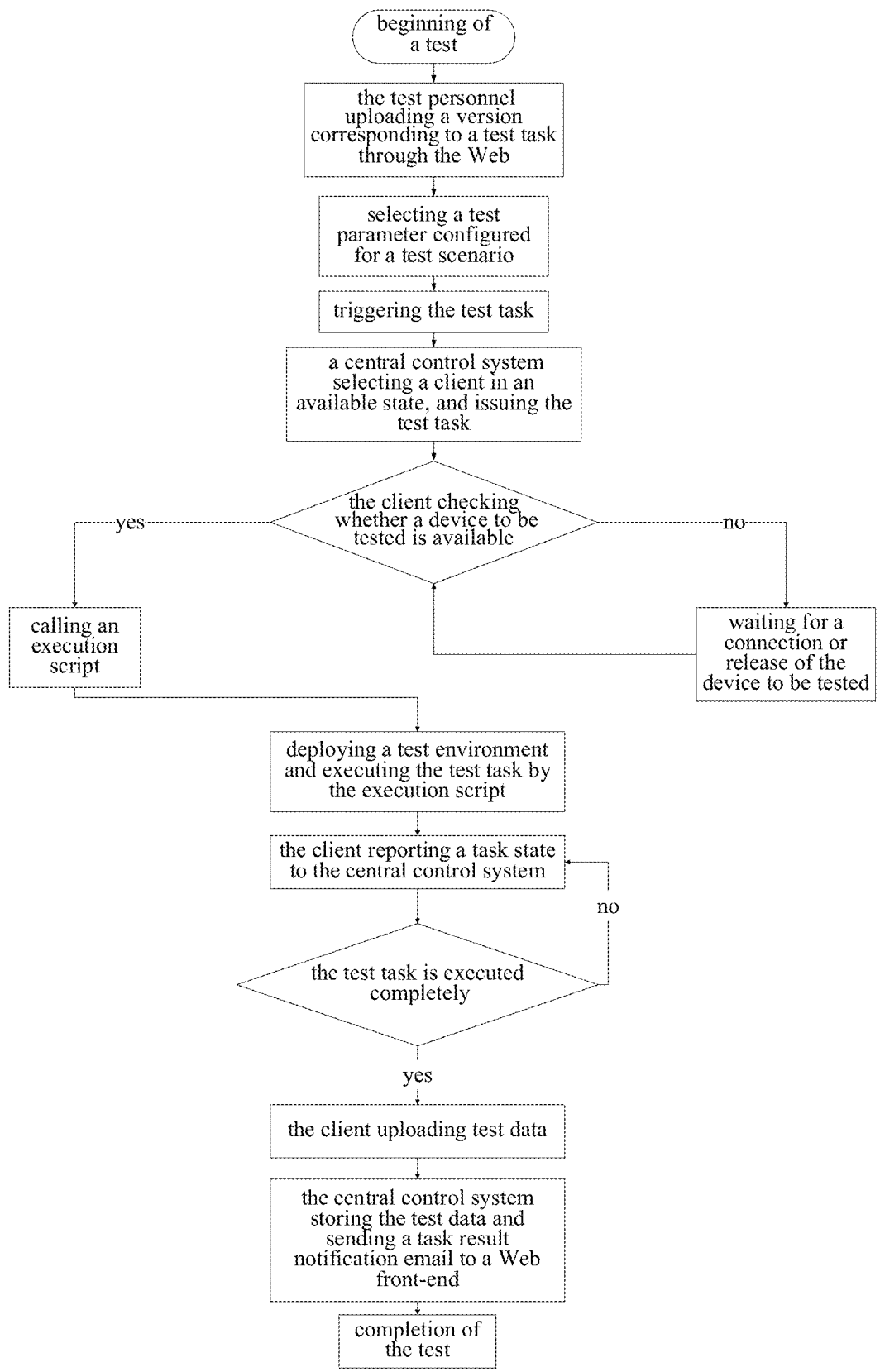
FIG. 8 is a system execution flowchart applied to an application example of an embodiment of the present disclosure.

FIG. 8 is a system execution flowchart applied to an application example of an embodiment of the present disclosure. As shown in FIG. 8, the flowchart includes: the test personnel uploading a test version corresponding to a test task through a Web front-end; selecting a test parameter configured for a test scenario; triggering the test task; a central control system selecting a client that is deployed and is in an available state, and issuing the test task; the client checking whether a device to be tested is available, if the device to be tested is available, calling an execution script, and if the device to be tested is not available, waiting for a connection or release of the device to be tested; deploying a test environment and executing the test task by the execution script; the client reporting a task state to the central control system; determining whether the test task is executed completely, if the test is executed completely, the client reporting a task execution result (that is, test data), and if the test is not executed completely, the client continuing to report the task state to the central control system; and the central control system storing the task execution result (that is, the test data), and sending a task result notification email to the Web front-end.

Fourth, Software and Hardware Underlying Auxiliary

Based on the above automatic test process, the existing software and hardware are modified to achieve the purpose of importing voice data into the tested device, which is not repeated.

Using this application example, a set of voice acoustic effect test system based on the principle of audio data import is used. The whole process is unattended and completed automatically, which is not only suitable for the voice test, but also suitable for the tests of various kinds of tasks. For the voice, the effect is remarkable for the test of the voice interaction function, the test of the voice acoustic effect, and the acceptance check of the acoustic effect, such that the test threshold of the overall voice effect test can be reduced, the system has high scalability, and the control of the whole test process and the data analysis are completed automatically. The test personnel only need to submit the task and view the test result on the platform, without artificial intervention in the test process. A simple and easy-to-use front-end entrance is provided, which greatly reduces the test threshold of acoustic effect and shortens the training cycle of the test personnel. High efficient device scheduling and parallel control are provided, such that the deployment is performed in many places on a large scale and the test task cycle is shorten in proportion. Good system scalability is provided, such that the test access of new products and new functions can be quickly completed. Test data persistence is provided, such that historical effect data and other task data are conveniently queried.

Figure 9:
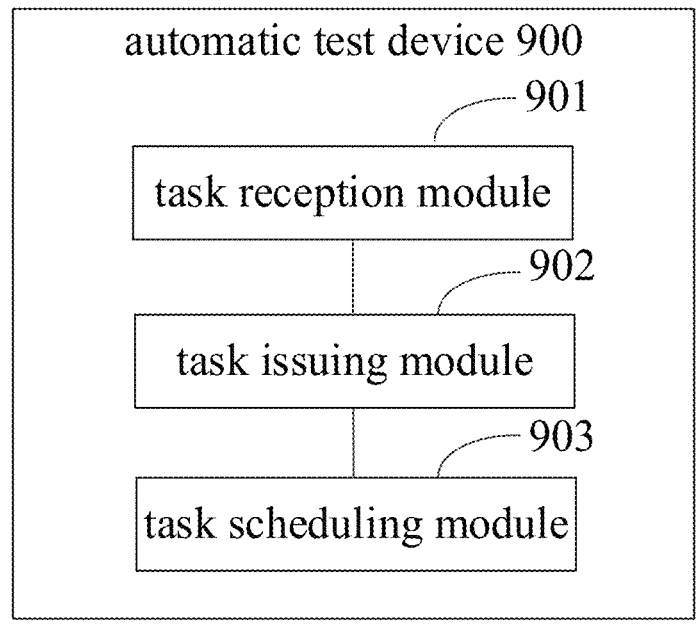
FIG. 9 is a schematic composition structure diagram of an automatic test device according to an embodiment of the present disclosure.

According to an embodiment of the present disclosure, an automatic test device is provided. FIG. 9 is a schematic composition structure diagram of an automatic test device according to an embodiment of the present disclosure. As shown in FIG. 9, the automatic test apparatus 900 includes: a task reception module 901, configured for receiving a test task initiated by a visualization front-end; a task issuing module 902, configured for issuing the test task to a plurality of clients deployed; and a task scheduling module 903, configured for scheduling execution of the test task for the plurality of clients, and feeding back obtained task execution results to the visualization front-end.

In an implementation, the task reception module is configured for: receiving the test task initiated by the visualization front-end through a hyper text transfer protocol, the test task includes: a test parameter and data to be tested, wherein the test parameter includes: at least one test parameter of a test product type, a test version, a test scenario, or a test device state.

In an implementation, the automatic test device further includes a client deployment module, configured for: receiving registration requests initiated by the plurality of clients respectively; in response to the registration requests, issuing a state query instruction to the plurality of clients respectively; and deploying the plurality of clients according to test task states reported by the plurality of clients respectively, wherein the test task states include: test task states of devices to be tested, connected to the plurality of clients respectively.

In an implementation, the task scheduling module is configured for: acquiring operation state information of devices to be tested, connected to the plurality of clients respectively, and performing the scheduling according to the operation state information of the devices to be tested; and receiving the task execution results reported respectively by the plurality of clients through a transmission control protocol, and feeding back the task execution results to the visualization front-end.

In an implementation, the automatic test device further includes a storage module, configured for: storing the task execution results locally or providing the task execution results to a cloud; and writing a local storage address or a storage address in the cloud into a database, to provide the storage address to the visualization front-end, such that the visualization front-end downloads the task execution results based on the storage address.

Figure 10:
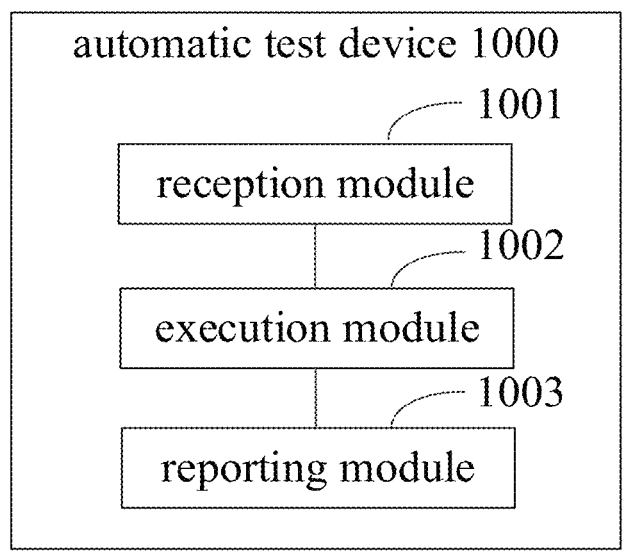
FIG. 10 is a schematic composition structure diagram of an automatic test device according to an embodiment of the present disclosure.

According to an embodiment of the present disclosure, an automatic test device is provided. FIG. 10 is a schematic composition structure diagram of an automatic test device according to an embodiment of the present disclosure. As shown in FIG. 10, the automatic test device 1000 includes: a reception module 1001, configured for receiving a test task issued by a central control system, wherein the test task is initiated by a visualization front-end; an execution module 1002, configured for accepting scheduling of the central control system and executing the test task, to obtain a task execution result; and a reporting module 1003, configured for reporting the task execution result to the central control system, such that the central control system forwards the task execution result to the visualization front-end.

In an implementation, the automatic test device further includes a deployment module, configured for: initiating a registration request to the central control system; receiving a state query instruction issued by the central control system; and in response to the state query instruction, reporting a test task state to the central control system, wherein the test task state includes test task states of devices to be tested, connected to the plurality of clients respectively, such that the plurality of clients are deployed based on the test task states.

In an implementation, the execution module is configured for: reporting operation state information of the devices to be tested, connected to the plurality of clients respectively, to the central control system, to accept the scheduling according to the operation state information of the devices to be tested; detecting whether the operation state information of the devices to be tested, connected to the plurality of clients respectively, is an available state; in a case where the devices to be tested are in the available state, calling execution scripts; and running the execution scripts, and executing the test task according to preset formats, to obtain the task execution results.

In an implementation, the reporting module is configured for: reporting the task execution result to the central control system through a transmission control protocol, to feed back the task execution result to the visualization front-end through the central control system.

Figure 11:
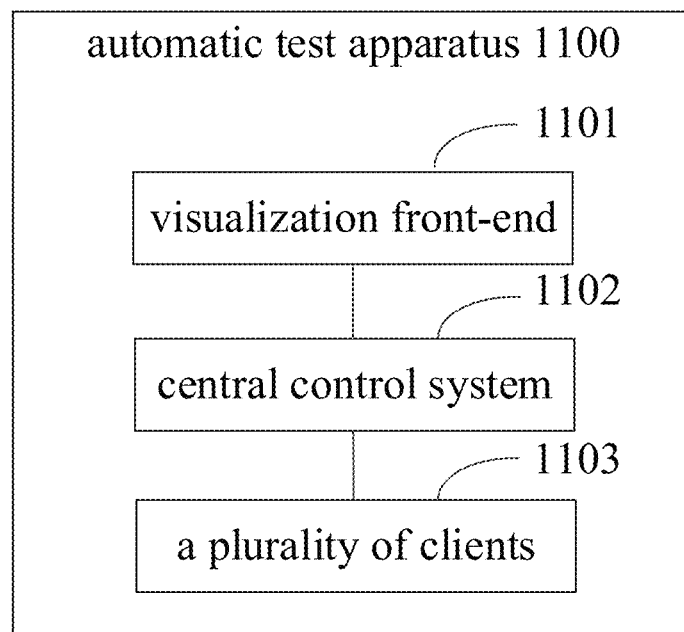
FIG. 11 is a schematic composition structure diagram of an automatic test apparatus according to an embodiment of the present disclosure.

According to an embodiment of the present disclosure, an automatic test device is provided. FIG. 11 is a schematic composition structure diagram of an automatic test device according to an embodiment of the present disclosure. As shown in FIG. 11, the automatic test device 1100 includes: a visualization front-end 1101, a central control system 1102, and a plurality of clients 1103, wherein the visualization front-end 1101 is configured for initiating a test task; the central control system 1102 is configured for receiving the test task and issuing the test task to a plurality of clients deployed 1103; the plurality of clients 1103 are configured for respectively accepting scheduling of the central control system 1102, executing the test task, and reporting obtained task execution results to the central control system 1102; and the central control system 1102 is further configured for feeding back the task execution results to the visualization front-end 1101.

In an implementation, the visualization front-end is further configured for initiating the test task through the HTTP. Specifically, the visualization front-end communicates with the central control system through an HTTP POST request method, and notifies the central control system of triggering/stopping of the test task, issuing of a test parameter, upload of version data to be tested, and download of test data, etc.

In an implementation, the central control system is further configured for: receiving registration requests initiated by the plurality of clients respectively; in response to the registration requests, issuing a state query instruction to the plurality of clients respectively; deploying the plurality of clients according to test task states reported by the plurality of clients respectively, wherein the test task states include: test task states of devices to be tested, connected to the plurality of clients respectively.

In an implementation, the plurality of clients are further configured for: respectively reporting operation state information of the devices to be tested, connected to the plurality of clients respectively, to the central control system, to accept the scheduling according to the operation state information of the devices to be tested; the plurality of clients respectively detecting whether the operation state information of the devices to be tested, connected to the plurality of clients respectively, is an available state; in a case where the devices to be tested are in the available state, the plurality of clients calling their respective execution scripts respectively; running the execution scripts, executing the test task according to respective preset formats required by the plurality of clients (such as formats required by the clients) to obtain the task execution results, and reporting the obtained task execution results to the central control system.

In an implementation, the central control system is further configured for: storing the task execution results locally or providing the task execution results to a cloud; and writing a local storage address or a storage address in the cloud into a database, to provide the storage address to the visualization front-end, such that the visualization front-end downloads the task execution results based on the storage address.

The function of each module in each apparatus of the embodiments of the disclosure can be referred to the corresponding description in the above method, which will not be repeated here.

According to an embodiment of the present disclosure, the present disclosure also provides an electronic device, a readable storage medium, and a computer program product.

Figure 12:
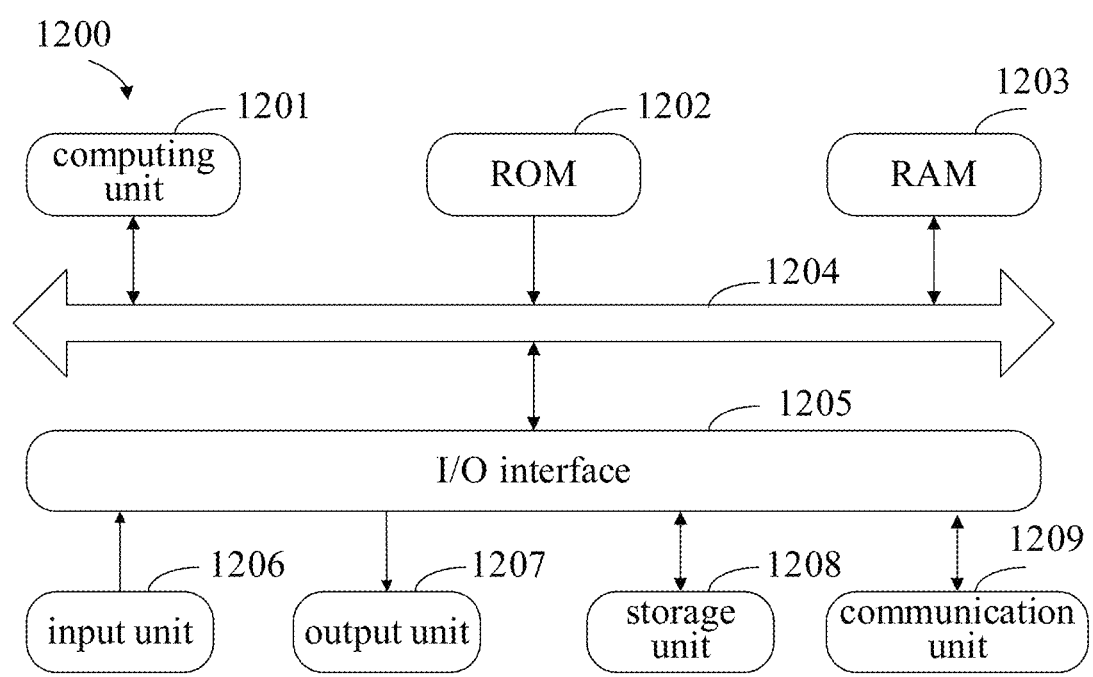
FIG. 12 is a block diagram of an electronic device for implementing an automatic test method of an embodiment of the present disclosure.

FIG. 12 is a block diagram of an electronic device for implementing an automatic test method of an embodiment of the present disclosure. The electronic device can be the aforementioned deployment device or agent device. Electronic apparatuses are intended to represent various forms of digital computers, such as laptop computers, desktop computers, workbenches, personal digital assistants, servers, blade servers, mainframe computers, and other suitable computers. Electronic apparatuses may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present disclosure described and/or claimed herein.

As shown in FIG. 12, an electronic device 1200 includes a computing unit 1201 that can perform various appropriate actions and processes according to a computer program stored in a read only memory (ROM) 1202 or a computer program loaded from a storage unit 1208 into a random access memory (RAM) 1203. In the RAM 1203, various programs and data required for the operation of the electronic device 1200 can also be stored. The computing unit 1201, the ROM 1202, and the RAM 1203 are connected to each other through a bus 1204. An input/output (I/O) interface 1205 is also connected to the bus 1204.

A plurality of components in the electronic device 1200 are connected to the I/O interface 1205, and include: an input unit 1206, such as a keyboard, a mouse, etc.; an output unit 1207, such as various types of displays, speakers, etc.; a storage unit 1208, such as a magnetic disk, an optical disk, etc.; and a communication unit 1209, such as a network card, a modem, a wireless communication transceiver, etc. The communication unit 1209 allows the electronic device 1200 to exchange information/data with other devices through computer networks such as the Internet and/or various telecommunication networks.

The computing unit 1201 may be various general-purpose and/or special-purpose processing components with processing and computing capabilities. Some examples of the computing unit 1201 include, but are not limited to, a central processing unit (CPU), a graphics processing unit (GPU), various special-purpose artificial intelligence (AI) computing chips, various computing units running machine learning model algorithms, a digital signal processor (DSP), and any appropriate processors, controllers, microcontrollers, etc. The computing unit 1201 performs various methods and processes described above, such as an automatic test method. For example, in some embodiments, the automatic test method may be implemented as a computer software program that is tangibly contained in a machine-readable medium, such as a storage unit 1208. In some embodiments, part or all of the computer programs may be loaded and/or installed on the electronic device 1200 via the ROM 1202 and/or the communication unit 1209. When the computer program is loaded into the RAM 1203 and performed by computing unit 1201, one or more steps of the automatic test method described above may be performed. Optionally, in other embodiments, the computing unit 1201 may be configured for performing the automatic test method by any other suitable means (for example, by means of firmware).

Various embodiments of the systems and technologies described above herein can be implemented in a digital electronic circuit system, an integrated circuit system, a field programmable gate array (FPGA), an application specific integrated circuit (ASIC), an application special standard product (ASSP), a system on chip (SOC), a load programmable logic device (CPLD), a computer hardware, firmware, software and/or combinations thereof. These various embodiments may include: implementations in one or more computer programs which may be executed and/or interpreted on a programmable system that includes at least one programmable processor, which may be a special-purpose or general-purpose programmable processor that may receive data and instructions from a storage system, at least one input device, and at least one output device, and transmit the data and instructions to the storage system, the at least one input device, and the at least one output device.

The program codes for implementing the method of the present disclosure may be written in any combination of one or more programming languages. These program codes can be provided to the processor or controller of a general-purpose computer, a special-purpose computer or other programmable data processing devices, such that the program codes, when executed by the processor or controller, enables the functions/operations specified in the flowchart and/or block diagram to be implemented. The program codes can be executed completely on the machine, partially on the machine, partially on the machine and partially on the remote machine as a separate software package, or completely on the remote machine or server.

In the context of the present disclosure, a machine-readable medium may be a tangible medium that may contain or store programs for use by or in combination with an instruction execution system, apparatus, or device. The machine-readable medium may be a machine-readable signal medium or a machine-readable storage medium. The machine readable medium may include, but is not limited to, an electronic, magnetic, optical, electromagnetic, infrared, or semiconductor system, apparatus or device, or any suitable combination of the above contents. A more specific example of the machine-readable storage medium will include an electrical connection based on one or more lines, a portable computer disk, a hard disks, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with a user, the system and technology described herein may be implemented on a computer which has: a display device (for example, a CRT (cathode ray tube) or an LCD (liquid crystal display) monitor) for displaying information to the user; and a keyboard and pointing device (for example, a mouse or a trackball), through which the user may provide input to the computer. Other kinds of devices may also be used to provide interactions with a user; for example, the feedback provided to a user may be any form of sensory feedback (for example, visualization feedback, auditory feedback, or tactile feedback); and input from a user may be received using any form (including acoustic input, voice input, or tactile input).

The systems and techniques described herein may be implemented in a computing system (for example, as a data server) that includes back-end components, or be implemented in a computing system (for example, an application server) that includes middleware components, or be implemented in a computing system (for example, a user computer with a graphical user interface or a web browser through which the user may interact with the implementation of the systems and technologies described herein) that includes front-end components, or be implemented in a computing system that includes any combination of such back-end components, intermediate components, or front-end components. The components of the system may be interconnected by any form or medium of digital data communication (for example, a communication network). The example of the communication network includes a local area network (LAN), a wide area network (WAN), and the Internet.

The computer system may include a client and a server. The client and the server are generally remote from each other and typically interact through a communication network. The client-server relationship is generated by computer programs that run on respective computers and have a client-server relationship with each other.

It should be understood that various forms of processes shown above may be used to reorder, add, or delete steps. For example, respective steps described in the present disclosure may be performed in parallel, or may be performed sequentially, or may be performed in a different order, as long as the desired result of the technical solution disclosed in the present disclosure can be achieved, no limitation is made herein.

The above specific embodiments do not constitute a limitation on the protection scope of the present disclosure. It should be understood by those skilled in the art that various modifications, combinations, sub-combinations, and substitutions may be made according to design requirements and other factors. Any modification, equivalent replacement and improvement, and the like made within the spirit and principle of the present disclosure shall be fall in the protection scope of the present disclosure.

What is claimed is:

1. An automatic test method, comprising:
    receiving a test task initiated by a visualization front-end;
    issuing the test task to a plurality of clients deployed; and
    scheduling execution of the test task for the plurality of clients, and feeding back obtained task execution results to the visualization front-end,
    wherein the method further comprises:
    receiving registration requests initiated by the plurality of clients respectively;

in response to the registration requests, issuing a state query instruction to the plurality of clients respectively; and deploying the plurality of clients according to test task states reported by the plurality of clients respectively, wherein the test task states comprise: test task states of devices to be tested, connected to the plurality of clients respectively.

2. The method of claim 1, wherein the receiving the test task initiated by the visualization front-end, comprises:
receiving the test task initiated by the visualization front-end through a hyper text transfer protocol,
the test task comprises: a test parameter and data to be tested, wherein the test parameter comprises: at least one test parameter of a test product type, a test version, a test scenario, or a test device state.

3. The method of claim 1, wherein the scheduling the execution of the test task for the plurality of clients, and feeding back the obtained task execution results to the visualization front-end, comprises:
acquiring operation state information of devices to be tested, connected to the plurality of clients respectively, and performing the scheduling according to the operation state information of the devices to be tested; and
receiving the task execution results reported respectively by the plurality of clients through a transmission control protocol, and feeding back the task execution results to the visualization front-end.

4. The method of claim 3, further comprising:
storing the task execution results locally or providing the task execution results to a cloud; and
writing a local storage address or a storage address in the cloud into a database, to provide the storage address to the visualization front-end, such that the visualization front-end downloads the task execution results based on the storage address.

5. An automatic test method, comprising:
receiving a test task issued by a central control system, wherein the test task is initiated by a visualization front-end;
accepting scheduling of the central control system and executing the test task, to obtain a task execution result; and
reporting the task execution result to the central control system, such that the central control system forwards the task execution result to the visualization front-end,
wherein the method further comprises:
initiating a registration request to the central control system;
receiving a state query instruction issued by the central control system; and
in response to the state query instruction, reporting a test task state to the central control system,
wherein the test task state comprises test task states of devices to be tested, connected to a plurality of clients respectively, such that the plurality of clients are deployed based on the test task states.

6. The method of claim 5, wherein the accepting the scheduling of the central control system and executing the test task, to obtain the task execution result, comprises:
reporting operation state information of the devices to be tested, connected to the plurality of clients respectively, to the central control system, to accept the scheduling according to the operation state information of the devices to be tested;

detecting whether the operation state information of the devices to be tested, connected to the plurality of clients respectively, is an available state;
in a case where the devices to be tested are in the available state, calling execution scripts; and
running the execution scripts, and executing the test task according to preset formats, to obtain task execution results.

7. The method of claim 5, wherein the reporting the task execution result to the central control system, such that the central control system forwards the task execution result to the visualization front-end, comprises:
reporting the task execution result to the central control system through a transmission control protocol, to feed back the task execution result to the visualization front-end through the central control system.

8. An automatic test method, comprising:
a visualization front-end initiating a test task;
a central control system receiving the test task and issuing the test task to a plurality of clients deployed;
the plurality of clients respectively accepting scheduling of the central control system, executing the test task, and reporting obtained task execution results to the central control system; and
the central control system feeding back the task execution results to the visualization front-end,
wherein the method further comprises:
the central control system receiving registration requests initiated by the plurality of clients respectively;
in response to the registration requests, the central control system issuing a state query instruction to the plurality of clients respectively; and
the central control system deploying the plurality of clients according to test task states reported by the plurality of clients respectively,
wherein the test task states comprise: test task states of devices to be tested, connected to the plurality of clients respectively.

9. An automatic test apparatus, comprising a visualization front-end, a central control system, and a plurality of clients, wherein
the visualization front-end is configured for initiating a test task;
the central control system is configured for receiving the test task and issuing the test task to a plurality of clients deployed;
the plurality of clients are configured for respectively accepting scheduling of the central control system, executing the test task, and reporting obtained task execution results to the central control system; and
the central control system is further configured for feeding back the task execution results to the visualization front-end,
the central control system is further configured for receiving registration requests initiated by the plurality of clients respectively;
in response to the registration requests, the central control system is further configured for issuing a state query instruction to the plurality of clients respectively; and
the central control system is further configured for deploying the plurality of clients according to test task states reported by the plurality of clients respectively,
wherein the test task states comprise: test task states of devices to be tested, connected to the plurality of clients respectively.

10. An electronic device, comprising:
at least one processor; and a memory connected communicatively to the at least one processor, wherein the memory stores instructions executable by the at least one processor, and the instructions, when executed by the at least one processor, enable the at least one processor to perform operations of:

receiving a test task initiated by a visualization front-end;

issuing the test task to a plurality of clients deployed; and scheduling execution of the test task for the plurality of clients, and feeding back obtained task execution results to the visualization front-end, wherein the instructions, when executed by the at least one processor, enable the at least one processor further to perform operations of:

receiving registration requests initiated by the plurality of clients respectively;

in response to the registration requests, issuing a state query instruction to the plurality of clients respectively; and deploying the plurality of clients according to test task states reported by the plurality of clients respectively, wherein the test task states comprise: test task states of devices to be tested, connected to the plurality of clients respectively.

11. The electronic device of claim 10, wherein the receiving the test task initiated by the visualization front-end, comprises:

receiving the test task initiated by the visualization front-end through a hyper text transfer protocol, the test task comprises: a test parameter and data to be tested, wherein the test parameter comprises: at least one test parameter of a test product type, a test version, a test scenario, or a test device state.

12. The electronic device of claim 10, wherein the scheduling the execution of the test task for the plurality of clients, and feeding back the obtained task execution results to the visualization front-end, comprises:

acquiring operation state information of devices to be tested, connected to the plurality of clients respectively, and performing the scheduling according to the operation state information of the devices to be tested; and receiving the task execution results reported respectively by the plurality of clients through a transmission control protocol, and feeding back the task execution results to the visualization front-end.

13. A non-transitory computer readable storage medium storing computer instructions, wherein the computer instructions, when executed by a computer, cause the computer to perform operations of:

receiving a test task initiated by a visualization front-end;

issuing the test task to a plurality of clients deployed; and scheduling execution of the test task for the plurality of clients, and feeding back obtained task execution results to the visualization front-end, wherein the computer instructions, when executed by a computer, cause the computer further to perform operations of:

receiving registration requests initiated by the plurality of clients respectively;

in response to the registration requests, issuing a state query instruction to the plurality of clients respectively; and deploying the plurality of clients according to test task states reported by the plurality of clients respectively, wherein the test task states comprise: test task states of devices to be tested, connected to the plurality of clients respectively.

14. An electronic device, comprising:

at least one processor; and a memory communicatively connected with the at least one processor, wherein the memory stores instructions executable by the at least one processor, and the instructions, when executed by the at least one processor, enable the at least one processor to perform operations of:

receiving a test task issued by a central control system, wherein the test task is initiated by a visualization front-end;

accepting scheduling of the central control system and executing the test task, to obtain a task execution result; and reporting the task execution result to the central control system, such that the central control system forwards the task execution result to the visualization front-end, wherein the instructions, when executed by the at least one processor, enable the at least one processor further to perform operations of:

initiating a registration request to the central control system;

receiving a state query instruction issued by the central control system; and in response to the state query instruction, reporting a test task state to the central control system, wherein the test task state comprises test task states of devices to be tested, connected to a plurality of clients respectively, such that the plurality of clients are deployed based on the test task states.

15. The electronic device of claim 14, wherein the accepting the scheduling of the central control system and executing the test task, to obtain the task execution result, comprises:

reporting operation state information of the devices to be tested, connected to the plurality of clients respectively, to the central control system, to accept the scheduling according to the operation state information of the devices to be tested;

detecting whether the operation state information of the devices to be tested, connected to the plurality of clients respectively, is an available state;

in a case where the devices to be tested are in the available state, calling execution scripts; and running the execution scripts, and executing the test task according to preset formats, to obtain task execution results.

16. A non-transitory computer readable storage medium storing computer instructions, wherein the computer instructions, when executed by a computer, cause the computer to perform operations of:

receiving a test task issued by a central control system, wherein the test task is initiated by a visualization front-end;

accepting scheduling of the central control system and executing the test task, to obtain a task execution result; and reporting the task execution result to the central control system, such that the central control system forwards the task execution result to the visualization front-end, wherein the computer instructions, when executed by a computer, cause the computer further to perform operations of:

initiating a registration request to the central control system;

receiving a state query instruction issued by the central control system; and in response to the state query instruction, reporting a test task state to the central control system, wherein the test task state comprises test task states of devices to be tested, connected to a plurality of clients respectively, such that the plurality of clients are deployed based on the test task states.

\* \* \* \* \*